United States Patent [19]

Hofmann

[11] 4,047,909
[45] Sept. 13, 1977

[54] VALVE SYSTEM PARTICULARLY FOR APPARATUS FOR PRODUCING DRY COMPRESSED AIR

[75] Inventor: Hans-Joachim Hofmann, Geradstetten, Germany

[73] Assignee: Durr-Dental KG., Germany

[21] Appl. No.: 569,449

[22] Filed: Apr. 18, 1975

[30] Foreign Application Priority Data

Apr. 20, 1974 Germany .................................. 2419177

[51] Int. Cl.² ............................................. B01D 35/00
[52] U.S. Cl. ........................................ 55/184; 55/185; 55/213; 55/218; 55/276; 55/311; 55/316; 55/342; 55/468; 55/DIG. 17; 137/116.3; 417/299
[58] Field of Search ................. 55/210, 212, 213, 218, 55/310–314, 276, 316, 342, 323, 337, 302, 387, 432, 468, 33, 163, 183, DIG. 17, 184, 185; 137/116.3; 417/299

[56] References Cited

U.S. PATENT DOCUMENTS

| | | | |
|---|---|---|---|
| 2,864,461 | 12/1958 | Dueker | 55/213 |
| 2,950,730 | 8/1960 | Svensson | 137/116.3 |
| 2,976,950 | 3/1961 | Smith | 55/212 X |
| 3,080,693 | 3/1963 | Glass et al. | 55/163 |
| 3,279,151 | 10/1966 | Kauer, Jr. et al. | 55/313 X |
| 3,399,510 | 9/1968 | Kauer, Jr. et al. | 55/33 |
| 3,592,563 | 7/1971 | Glass et al. | 55/316 X |
| 3,696,588 | 10/1972 | Dussourd et al. | 55/163 |
| 3,698,839 | 10/1972 | Distefano | 417/299 |
| 3,923,479 | 12/1975 | Glass et al. | 55/163 |
| 3,934,989 | 1/1976 | Haugen | 55/163 |

*Primary Examiner*—Frank W. Lutter
*Assistant Examiner*—Kathleen J. Prunner
*Attorney, Agent, or Firm*—Robert E. Burns; Emmanuel J. Lobato; Bruce L. Adams

[57] ABSTRACT

Apparatus for producing dry compressed air comprises a compressor which delivers air to a dry air storage tank through a cooling coil, a liquid separator comprising a housing having a cavity with a valve controlled tap opening at the bottom thereof, a screening filter and an adsorption filter connected in sequence. A pressure sensitive switch turns off the compressor when a predetermined pressure has built up in the storage tank. When delivery of air ceases, a valve control system opens the tap opening of the separator and second valve control system opens a valve to permit back flow of air from the dry air storage tank back through the adsorption filter to regenerate it and out of the tap opening if the moisture content of air in the dry air storage tank is above a predetermined level. The first valve control system which controls the opening of the tap opening comprises a diaphragm which divides the cavity of the housing into a lower chamber which comprises the liquid separator and an upper chamber, means connecting the diaphragm with the valve of the tap opening and a valve assembly connected in circuit between the separator and the adsorption filter and comprising a Borda nozzle for producing a reduced pressure in the upper chamber to close the tap opening when compressed air is being delivered, a bypass valve and check valve in parallel with said Borda nozzle and an auxiliary valve for connecting the upper chamber with the atmosphere in order to close the tap opening in the event the compressor starts up again after a short interruption.

19 Claims, 7 Drawing Figures

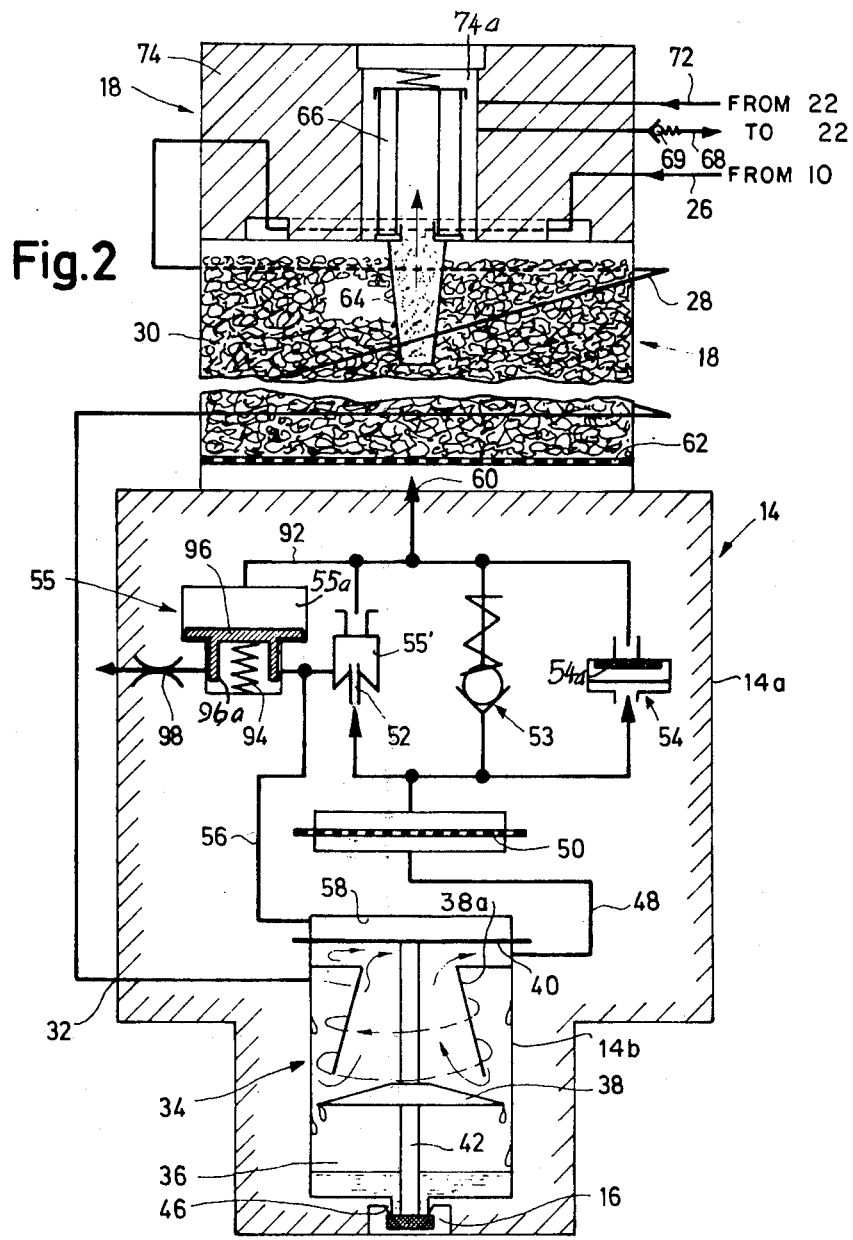

VALVE SYSTEM PARTICULARLY FOR APPARATUS FOR PRODUCING DRY COMPRESSED AIR

FIELD OF INVENTION

The present invention relates to a valve system, particularly for apparatus for producing dry compressed air, having an inlet opening, an outlet opening and an intermediate tap opening which can be closed as a function of the pressure at the inlet opening.

BACKGROUND OF INVENTION

A valve system of this general type is described in U.S. Pat. No. 3,399,510 which relates to a dry air plant in which a valve system lying between the outlet of a compressor and the inlet of an adsorption filter contains an oil-water trap serving to remove liquid condensation products from a supersaturated stream of compressed air and to collect them in a water chamber during the operation of the compressor. In the known valve system, a tap opening for discharging the collected liquid is opened by means of a solenoid valve which in turn is controlled by a pressure sensitive switch which responds as soon as a predetermined pressure has been reached in a compressed air tank to stop the compressor and simultaneously energize the solenoid valve. Upon opening of the tap opening, the collected condensate can flow out of the water chamber, followed then by the air which, with the compressor stationary, is conducted in a reverse direction through the absorption filter in order to regenerate the latter.

It has been found that the known valve system described above does not satisfy all requirements since it needs a separate control which leads to difficulties, particularly in case of export, inasmuch as frequently different power line voltages and/or frequencies are present at the place of reception and furthermore different electrical safety regulations apply than in the country of manufacture. This has the result that in order to place the equipment into operation, conversion work is frequently necessary which is in all cases expensive and can furthermore, if it is not carried out properly, lead to technical difficulties and to complaints.

SUMMARY OF INVENTION

The object of the present invention is therefore to provide an improved valve system which does not require electrical operation or external control devices.

This object is attained by a valve device in accordance with the invention by the fact that the tap opening for discharge of collected liquid can be closed by a valve tappet fastened to a diaphragm and that the pressure at the inlet opening acts on one side of the diaphragm while a pressure derived therefrom by means of a suction-jet nozzle arrangement (Borda nozzle) acts on the other side thereof.

The valve system in accordance with the invention therefore operates without electrical power or any external control, solely with the pressures made available by the source of compressed air or pressure derived therefrom, which results in considerable advantages for delivery abroad since, for instance when the valve system is used in a dry air plant, it is only necessary further to provide a compressor adapted to the local power line voltages and frequencies or a drive motor for the compressor. Upon connection to an existing compressed air system the elimination of other control energies and control devices is particularly advantageous.

It has been found desirable in the case of the valve system of the present invention for a bypass valve, which opens when the pressure at the inlet opening exceeds the pressure at the outlet opening by a predetermined amount, to be connected in parallel with the Borda nozzle. This development of the invention affords the possibility of dimensioning the Borda nozzle solely in accordance with the desired decrease of pressure to be applied on the one side of the diaphragm without it being necessary to tolerate substantial pressure losses during the conveying of the compressed air since the main portion of the compressed air conveyed after an initial phase flows through the shunt-connected bypass valve.

When the valve system of the invention is used in dry air plants, it has furthermore been found advantageous when a check valve which opens when the pressure at the outlet opening exceeds the pressure at the inlet opening is connected in parallel to the Borda nozzle and the bypass valve. This additional valve can then permit the passage to the branch opening of the compressed air which during the regeneration phase flows through the adsorption filter of the dry air plant. This check valve also assures in an extremely advantageous manner that the pressure throughout the entire system is brought to atmospheric pressure very rapidly after the disconnecting of the compressor. In this way the quantity of regeneration air can be reduced.

As a further development of the invention it has also been found desirable to provide in addition to the three above mentioned valves, an auxiliary valve which, upon a decrease of the pressure at the outlet opening and accordingly at other places in the valve system to a predetermined minimum pressure, opens a connection between the side of the diaphragm facing away from the inlet opening and therefore the chamber lying above it and the atmosphere. The use of such an auxiliary valve makes it possible, when using the valve means in dry air plants, to close the tap opening before the pressure in the adsorption filter upon disconnection of the compressor has reached atmospheric pressure so that even after a short interruption of the drive of the compressor, compressed air can again be immediately conveyed into a compressed air tank. Another solution, and one which is even better for many cases, is to provide a similar but somewhat differently shaped auxiliary valve by means of which the control of the closure member depends not only on the pressure in the system alone but also on the presence or absence in the Borda nozzle of a flow producing in the vacuum chamber a lesser pressure than on the inlet side.

BRIEF DESCRIPTION OF DRAWINGS

The nature and advantages of the invention will be explained in further detail below with reference to the accompanying drawings in which:

FIG. 2 is an enlarged schematic longitudinal section through the separator and adsorption filter of the apparatus of FIG. 1 and through an associated valve system;

DESCRIPTION OF PREFERRED EMBODIMENTS

Figure 1:
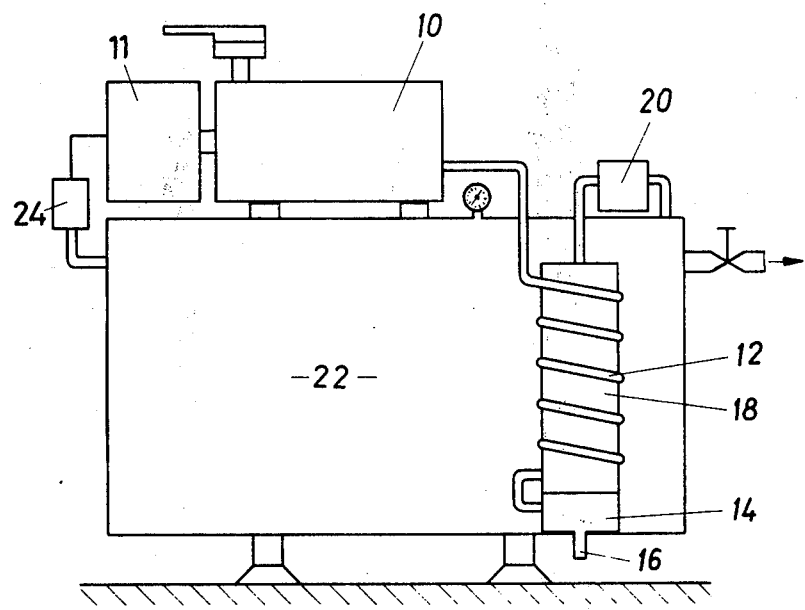
FIG. 1 is a diagrammatic showing of an apparatus including a separator and adsorption filter for the producing of dry compressed air.

The apparatus shown schematically in FIG. 1 comprises a compressor 10 with motor 11 as a source of compressed air, followed by a cooler 12. It is obvious that when an ordinary compressed air system serves as a source of pressure, the cooling device can be dispensed with. Downstream of the cooling device 12 there is a separator 34 which customarily includes an oil and water trap and which has a tap opening 16 for discharging collected liquid. The opening of the tap opening 16 is controlled by a valve system 14. Downstream of the separator 34 and valve system 14 there is a drier and filter 18 which, as can be seen from FIG. 2, comprises an adsorption filter 30 and additional mechanical or screening filters which are described below. The filter 18 is connected with a compressed air storage tank 22 through a second valve system 20. As long as the compressor 10 is in operation or as long as compressed air is supplied from a compressed air system, the unpurified compressed air, after cooling and after removal of liquid droplets by the separator 34, flows through the filter 18 where it is further purified and dried and through the second valve system 20 into the compressed air storage tank 22. During this operating phase, the apparatus of FIG. 1 operates in customary manner and, except as described below, essentially with the use of ordinary parts or groups of parts a detailed description of which can therefore be dispensed with here. As soon as a predetermined pressure has built up in the compressed air storage tank 22, the compressor 10 is disconnected by a pressure sensitive switch 24 which is in communication with the interior of the compressed air tank 22.

In a known device of the type described above which operates with a single adsorption filter, a regeneration cycle is introduced automatically upon the disconnecting of the compressor 10, during the course of which cycle a predetermined quantity of dry compressed air from an auxiliary storage tank is passed through the filter 18 and blown out into the atmosphere through the tap opening 16 of the separator 34. However, in the case of the apparatus shown in FIG. 1, the second valve system 20, as will be explained in further detail below, is so developed that a regeneration cycle is only introduced when the moisture of the compressed air in the compressed air tank 22 reaches or exceeds a predetermined upper limit. Furthermore, the compressed air required for regenerating the filter 18 is taken directly from the compressed air storage tank 22 and not from an auxiliary tank, as in the previously known devices.

In one preferred embodiment of an apparatus in accordance with FIG. 1, the filter 18 as well as the separator 34 and the valve system 14 are combined to form a structural unit which is shown in FIG. 2, which furthermore shows the cooling device 12 as well as a part of the second valve system 20. As seen in FIG. 2 the valve system 14 and separator 34 are in a common housing 14a having a cavity 14b for the separator 34.

Compressed air is fed from the compressor 10 by a feed line 26 to the structural unit of FIG. 2 while the compressor is in operation. The compressed air is relatively hot as a result of the compression and reaches temperatures of up to about 115° C. Since the cleaning and drying of the compressed air can be carried out only below temperatures of about 60° C, the compressed air must first of all be cooled to this temperature. This is done in a cooling coil 28 which wraps around the entire length of the adsorption filter 30 which is shown broken-off in the drawing. In passing through the coil 28 the compressed air from the compressor 10 is cooled by dissipation of heat to the atmosphere and to the adsorption filter 30 which the coil 28 surrounds. The cooling coil 28 is part of the cooling apparatus designated 12 in FIG. 1.

From the cooling coil 28, the cooled compressed air passes to the inlet opening 32 of the separator 34 which is formed as one unit with the valve system 14. The separator 34 comprises a cyclone-type oil and water separator in which condensation products are removed from the compressed air which is supersaturated after the cooling in the cooling coil 28. The condensation products are collected in a collecting chamber 36 at the lower end of the precipitator or oil and water separator 34 below a baffle plate 38.

The oil and water separator 34 is contained in the cavity 14b near the top of which there is a flexible diaphragm 40 which divides the cavity 14b into two chambers, a smaller chamber 58 above the diaphragm and a larger chamber 36 below. The inlet opening 32 of the separator opens into the chamber 36 below the diaphragm 40 but above the baffle 38. To the bottom side of the diaphragm 40 facing the chamber 36 there is fastened a valve member 42 which cooperates with a valve seat 46 at the bottom of the chamber 36. The valve member 42 and valve seat 46 together form the closable branch opening or tap opening 16 of the apparatus of FIG. 1.

In the upper portion of the chamber 36 which contains the oil and water separator 34 but below the diaphragm 40 there is provided an annular baffle 38a above which there is an outlet duct 48 which extends through a filter sceen 50 to various individual valves of the valve means 14. As illustrated in FIG. 2, a total of four individual valves 52 to 55 are provided, the operation of which will be explained below.

The individual valves include, first of all, a suction ejection nozzle 52 which is referred to below in usual manner as a Borda nozzle. The nozzle opening of the Borda nozzle 52 is surrounded by a suction chamber 55' which is in communication by a connecting line 56 with the chamber 58 above the diaphragm 40. When compressed air flows into the separator 34 through the inlet opening 32 and flows out through the line 48 to the Borda nozzle 52, a vacuum is produced in the chamber 55' and acts through the connecting line 56 on the chamber 58 above the diaphragm 40, thus lifting the diaphragm and thereby pulling the valve member 42 against the valve seat 46 to close the tap opening. The compressed air supplied by the compressor 10 to the separator 34 through the inlet 32 can therefore not escape through the tap opening 16.

Parallel to the Borda nozzle 52 there is provided, as second individual valve, a spring loaded bypass valve 53 which opens when a pressure gradient of about 0.1 bar is reached and thereby maintains an approximately constant pressure drop across the Borda nozzle. Hence only a slight pressure drop is present even in the case of large quantities of flow, so that even with full delivery of compressed air by the compressor the Borda nozzle 52 maintains a pressure difference of about 1 bar between the top of the diaphragm 40 and the bottom thereof. The other individual valves 54 and 55, which will be described below, remain normally closed during the feeding of compressed air to the compressed air storage tank 22 by the compressor 10. Downstream of the individual valves 52 to 55 is the outlet opening 60 of the valve system 14.

From the outlet opening 60 the prepurified saturated compressed air passes to the filter 18 which comprises an additional filter screen 62 and an adsorption filter 30. At the upper end of the adsorption filter 30, the dried compressed air passes through a sintered filter 64 as well as an after filter 66. Finally, the air passes from the filter 18 by a line 68, in which a nonreturn valve 69 is provided, to the compressed air tank 22. The nonreturn valve 69 is a part of the second valve system 20 in FIG. 1.

Figure 3:
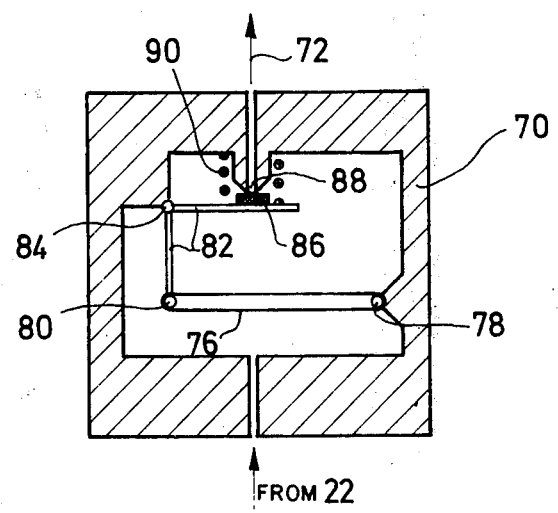
FIG. 3 is a schematic section of a valve for the apparatus in accordance with FIG. 1 which can be actuated by means of a moisture-sensitive feeler element.

Connected to the compressed air storage tank 22 is a valve 70 which is shown in FIG. 3 and which is a part of the second valve system 20. The outlet of the valve 70 is connected by a return line 72 with the filter 18, and specifically with a filter head 74 thereof which will be described in further detail below.

The valve 70 contains as actuating element a resin band 76, for instance of a suitable polyamide, which stretches upon an increase in the moisture content of the compressed air storage in the compressed air storage tank 22. The resin band 76 has its one end 78 connected firmly to the valve housing of the valve 70 and has its other end 80 connected to the lower end of a bell crank lever 82 which is swingable around a pivot point 84. The upper arm of the bell crank lever 82 which extends horizontally in the drawing is formed as a plate which faces away from the resin band 76 and bears a seal, for instance in the form of a small pad of rubber 86, by which a valve opening 88 can be closed. The arm of the bell crank lever 82 which bears the rubber pad 86 is acted on by the pressure within the compressed air tank 22 in a direction to close the valve. In order to counteract these pressure forces, a compressor spring 90 acts downwardly on the plate-shaped arm. The resin band 76, the length of the lever arms, the area of the lever arm bearing the rubber pad 86 and the compression spring 90 are so dimensioned that the rubber pad 86 releases the valve opening 88 when the compressed air in the compressed air tank 22 reaches a predetermined moisture content so that a regenerating cycle can be initiated as soon as the compressor 10 is disconnected and the tap opening 16 opened.

Upon the disconnecting of the compressor 10, an equalization of pressure first of all takes place between the top and the bottom of the diaphragm 40 since the Borda nozzle 52 can no longer maintain a vacuum in the chamber 58 as a result of the absence of flow through the nozzle. After pressure equalization has been effected, the valve member 42 drops away from the valve seat 46 so that the tap opening 16 is now opened. The oil-water mixture which has collected in the bottom of chamber 36 during the charging process first of all flows outward through the opening 16 behind which a muffler is preferably provided. Thereupon the compressed air which has remained in the filter 18 flows out through the third individual valve of the valve system 14 which comprises a check valve 54. The check valve 54 is shown as comprising a diaphragm or valve plate 54a which is movable between a closed position in which it seats on an annular valve seat as shown in the drawing and an open position in which it is unseated. The valve blocks flow in a direction from the separator 34 to the filter 18 while permitting flow from the filter 18 to the separator 34 and thence out through the tap opening 16 when the latter is open.

Upon the disconnecting of the compressor or the feeding of compressed air from a supply system, different conditions prevail in the filter 18 and the valve system 14 depending upon the position of the valve 70. If the valve 70 is closed at the time of the disconnecting of the compressor 10, i.e., if the compressed air in the compressed air storage tank 22 is still so dry that no regenerating of the adsorption filter 30 of the filter 18 is necessary, the pressure in the filter 18 as well as in the valve system 14 will drop to atmospheric pressure and the system then remains at rest until the pressure in the compressed air tank 22 falls below a lower limit, whereupon the compressor 10 is again started by the pressure responsive switch 24. As soon as air again flows from the compressor into the oil-water separator 34, the diaphragm 40 will suddenly be lifted and the tap opening 16 closed so that the compressed air, after passing through the filter 18, is finally pumped through line 68 to the compressed air storage tank 22.

On the other hand if the valve 70 is open when the compressor is disconnected, then after the equalization of pressure on opposite sides of the diaphragm 40, and the opening of the tap opening 16, dry compressed air will flow out of the compressed air storage tank 22 through the adsorption filter 30, which is thereby regenerated and out through the tap opening 16. In this connection, the pressure in the adsorption filter 30 and in the valve system 14 drop approximately to atmospheric pressure. The pressure which is established depends on the flow conditions and resistances in the valve system 14. The regenerating cycle terminates as soon as the compressor starts up again.

If the compressor 10 interrupts its operation only for a very short period of time, for instance for less than five seconds, as may be the case in event of brief interruptions of current in the feed circuit of an electric motor driving the compressor, there is the danger that the pressure in the valve system 14 and in the filter 18 has not yet dropped to atmospheric pressure when the compressor is restarted. In such case, the compressed air supplied by the compressor 10 is not able to lift the diaphragm 40 so that, unless special measures are taken, with the tap opening 16 open there would gradually be established an equilibrium condition in which practically the entire air delivered by the compressor 10 would escape through the tap opening 16. In order to prevent this, a fourth individual valve is provided in the valve system 14 in the form of a cut-off valve 55 which is actuatable pneumatically against the pressure of a reset spring. The cut-off valve, as illustrated in the drawing, comprises a control member shown as a piston 96 working in a chamber 55a which is connected at its top by a connecting line 92 with the outlet opening 60 of the valve system 14 and is thus acted on by the pressure at the outlet opening 60. A compressing spring 94 acts against the bottom of the piston. As soon as the pressure on the top of the piston drops below a griven lower limit the spring 94 forces the piston 96 upward so that closure means in the form of a skirt portion 96a opens a connection between line 56 connected with the hollow space 58 on the top of the diaphragm 40 and a throttle valve 98 which opens into the atmosphere. In this way the result is obtained that when the compressor 10 starts again after it has been interrupted for only a short time, the required pressure difference is very rapidly produced between the two sides of the diaphragm 40 so that the tap opening 16 is definitely closed after a short starting up phase, whereupon the delivery of compressed air to the compressed air storage tank 22 can again take place. On the other hand, the cut-off valve 55 in no way prevents the return of compressed air from the tank 22 through the adsorption filter 30 since during the regenerating phase only small quantities of air flow at low pressure through the valve system so that an equalization of pressure is always assured between the two sides of the diaphragm 40. It has also been found desirable if the auxiliary valve 55, instead of containing a piston, has a diaphragm provided with a valve member which at sufficiently high pressure at the outlet opening 60 of the valve system 14 closes a valve opening which leads to the throttle valve 98 and opens this valve opening as soon as the valve member is lifted off from the valve opening by a compression spring as the pressure drops.

As already mentioned above, a special filter head 74 is provided at the upper end of the adsorption filter 30. The filter head 74 has within it a hollow space 74a containing the after filter 66 below which the sintered filter 64 is arranged. The feed line 26 through which the hot compressed air flows from the compressor 10 passes through the filter head 74 without, however, being connected to the space 74a. This construction has the advantage that the filter head 74 is heated up when the compressor 10 is in operation so that the compressed air arriving through the return line 72 is heated during the regenerating phases and thus has an improved drying effect. From the above it is clear that FIG. 2 is only very schematic with respect to the arrangement of the lines 26 and 72 and the filter head 74 and that in actual practice said lines are laid in such a manner as to assure optimum heating of the filter head 74 and optimum transfer of heat to the return line 72.

Another advantage of the construction of the invention is that all parts of the valve system 14 are arranged in a single housing block which consists preferably of a material of good thermoconductivity, for instance aluminum, so that practically no temperature gradient results between the inlet opening 32 and the outlet opening 60. This is important insofar as adsorption filters are very sensitive to supersaturated compressed air. By this construction of the filter system and valve system the result is obtained that practically no further cooling of the compressed air takes place beyond the oil-water separator 34 so that saturated and not supersaturated compressed air is fed to the adsorption filter 30 which, furthermore, is connected directly with the housing block of the valve system 14. The compact construction of the filter 18 and of the valve system 14 in the form of a single structural unit thus leads to relief of the adsorption filter 30 and to shortened times of regeneration and on the whole to a longer life expectancy of the adsorption filter. Furthermore, the construction of the valve system 14 has the advantage that with the pneumatic pressure present or pressures derived therefrom all valve functions can be controlled so that additional control devices and particularly electrical control devices can be dispensed with. The dispensing with additional electric control devices in particular is very advantageous since the device can now be shipped to all countries completely mounted without regard to the different national and international regulations with regard to electrical safety and regardless of the different power line voltages and frequencies. It is merely necessary at the place of installation to provide a suitable compressor or a suitable drive motor for the compressor or some other source of compressed air.

Finally, it may also be pointed out that it is favorable to provide in the return devices a throttle valve by means of which the air returned into the adsorption filter can be substantially reduced in pressure so as to obtain an optimum utilization of the regenerating air and thus a high efficiency. In the embodiment in question the valve opening 88 has the effect of a throttle valve, it being so narrow, having for instance a diameter of only 0.75 mm, that the pressure in the adsorption filter 30 during the regenerating phases only slightly exceeds atmospheric pressure.

Furthermore, in devices with and particularly without a compressor, it is advantageous to provide a connection for a compressed air supply directly at the inlet opening 32 since when compressed air is fed from a compressed air network the compressed air need not be cooled.

FIGS. 4 to 7 show an embodiment which is similar except for two parts to the one shown in FIG. 2. Identical parts are identified by the same reference numbers. With respect to these parts and their matter of operation reference is had to the explanation given of the preceding examples.

Figure 4:
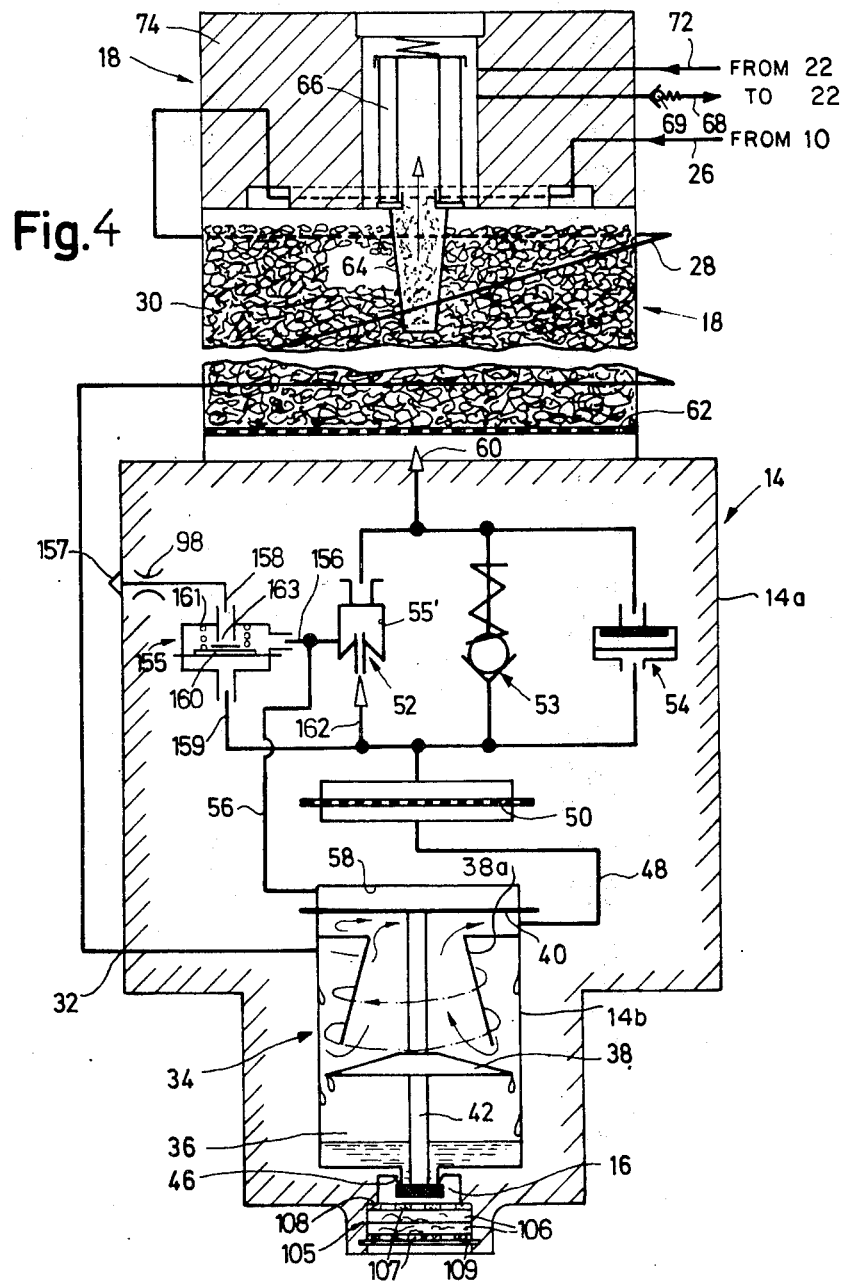
FIG. 4 is a schematic view corresponding to FIG. 2 showing another embodiment of the valve system.
Figure 5:
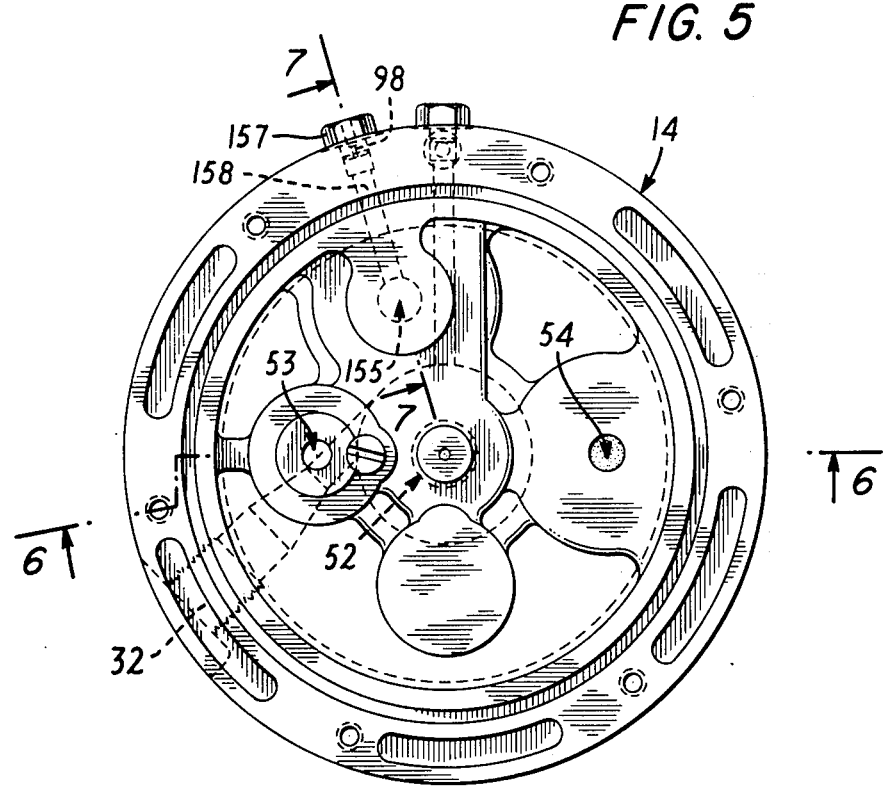
FIG. 5 is a plan of a valve assembly and separator such as is shown in FIG. 4.
Figure 7:
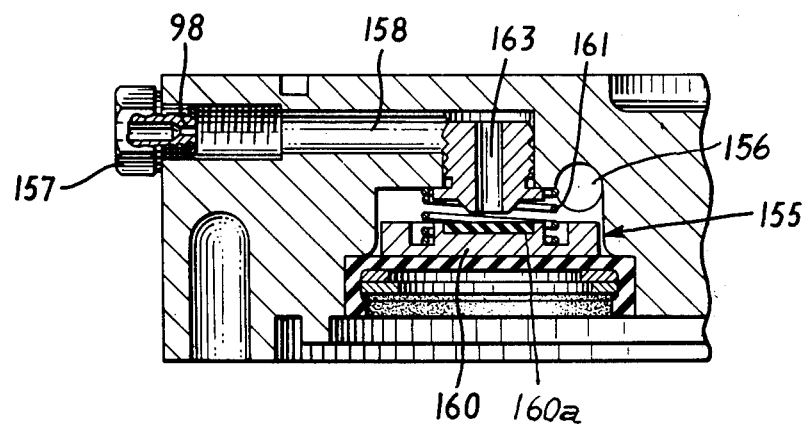
FIG. 7 is a section taken on line 7—7 in FIG. 5 and showing a fourth valve.
Figure 6:
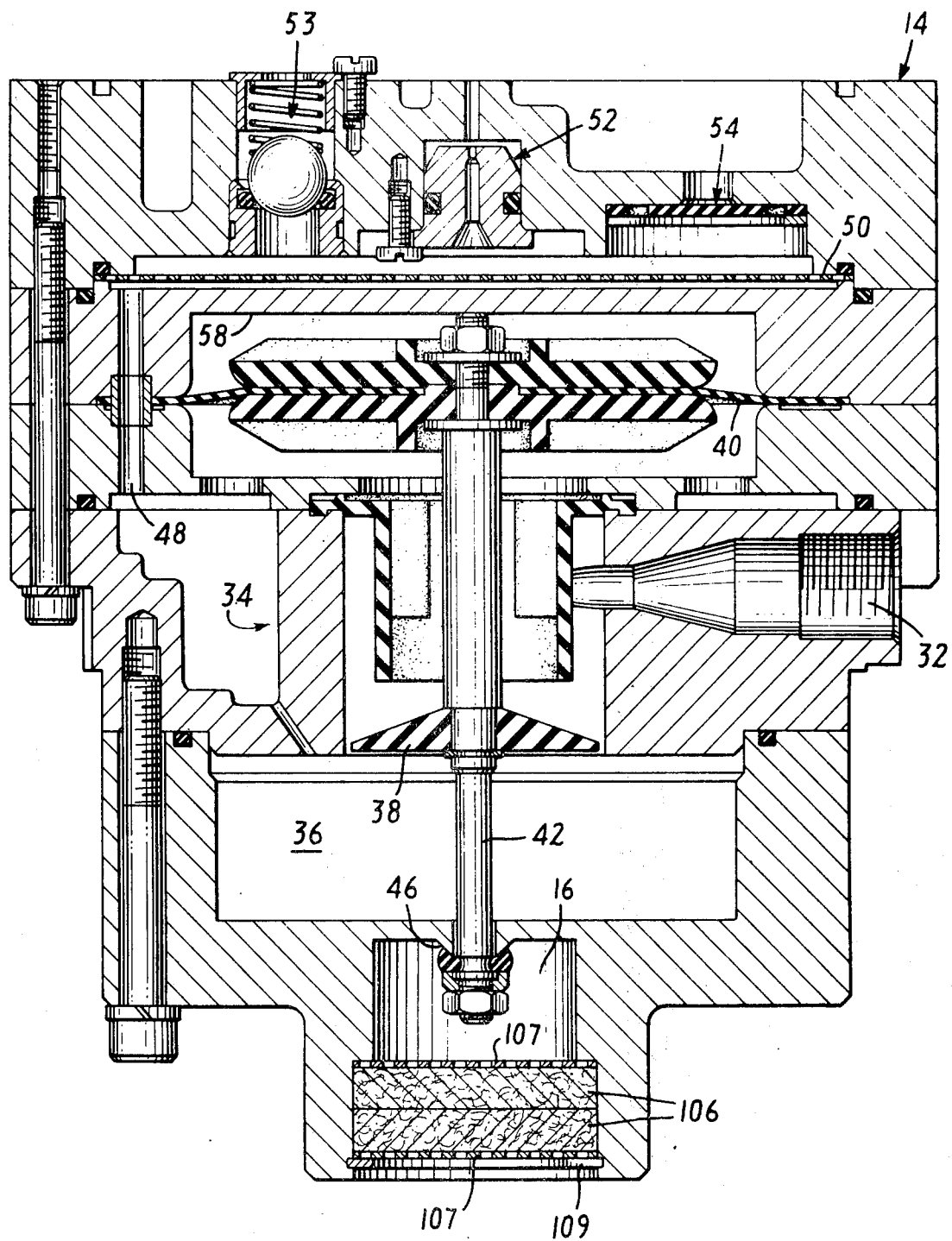
FIG. 6 is a section taken on line 6—6 in FIG. 5.

On the one hand there is shown in FIG. 4 a noise-silencing filter 105 for the tap opening 16. It consists of two thick felt disks 106 which are arranged between perforated supporting disks 107 the upper of which rests against a collar 108 and the lower of which is held fast by means of a lock washer 109.

On the other hand, the auxiliary valve 155 corresponding to the auxiliary or cut-off valve 55 in FIG. 2 is developed slightly differently. The auxiliary valve 155 also serves for the opening and closing of a line 156, 158 between the chamber 55' of the Borda nozzle 52 and the point of emergence to the atmosphere indicated by the arrow 157. A throttle 98 is also present in the line 158. The auxiliary valve 155 can assume two positions, namely "open" and "closed." A control member 160 is acted on, on opposite sides, by pressure from the lines 156 and 159 respectively, spring means in the form of a weak compressing spring 161 being provided in addition on the side on which the pressure from the line 156 acts so that the auxiliary valve 155 operates under the action of an air pressure and the force of the spring 161. A line 159 is connected with the inlet line 162 of the Borda nozzle 52 while the line 156 is connected with the line 56 leading to the chamber 58 above the diaphragm 40 and furthermore with the suction chamber 55'. The control member 160 consists of a diaphragm clamped tightly in the housing and closure bearing means in the form of a pressure and sealing plate 160a which can close the outlet opening 163 connected with line 158 and against which there rests the weak compression spring 161, the other end of which rests against the housing wall. As the result of the fact that the control member 160 rests against a seat surrounding the outlet opening 163, the effective area subject to pressure on the top of the control member 160 is less than on the bottom thereof. In this connection the effective surface areas on opposite sides of the control member 160 and the force of the spring 161 are so adapted to each other that when a flow takes place in the Borda nozzle 52 in the direction indicated by arrow in line 162 and therefore a lower pressure is present in the suction chamber 55' than in the line 162, the connection of the line 156, 158 is closed off, while when there is no flow through the Borda nozzle in the direction of the arrow shown in the line 162 and therefore no pressure drop takes place in the suction chamber 55' because, for instance, the system is at rest or a slight flow takes place in the opposite direction, and accordingly the same pressure prevails on both sides of the control member 160 of the auxiliary valve 155 and the lines 156 and 159, the auxiliary valve 155 is then open by the force of the spring 161 when the pressure in the lines connected with the auxiliary valve 155 lies below a predetermined minimum pressure.

The auxiliary valve 155 serves the same purpose as the auxiliary valve 55 of the first embodiment and operates in principle in the same manner. However, it can adjust itself better—and with more reliability—to different operating conditions which occur. If, for example, the feed of compressed air to the inlet opening 32 of the valve system 14 is disconnected only for a short time, for example when the compressor stops as a result of a brief interruption of current, a residual pressure remains in the filter 18 and the valve system 14, as a result of the resistances to flow in the lines and valves and the merely brief period of time, which is not sufficient for a complete equalization of pressure. This residual pressure will be approximately the same at the outlet opening 60 and in the line 162, particularly as the check valve 54 makes free backward flow possible. Since no flow takes place in the Borda nozzle 52 which would cause a decrease in pressure in the suction chamber 55', the same pressure prevails on both sides of the control member 160 of the auxiliary valve 155. When this pressure drops below a pressure of, for instance, 3.5 bar, the spring 161 opens the connection of the line 156, 158 so that atmospheric pressure is established in this line, the line 56 and the chamber 58 while a certain residual pressure still prevails in the rest of the system. If the feed of compressed air again starts at the inlet opening 32, the diaphragm 40 can suddenly rise up and close the tap opening 16 so that the compressed air fed does not escape through the tap opening 16 but flows in the direction towards the filter 18 and thus also through the line 162 and the Borda nozzle 52 so that there is again produced in the suction chamber 55' a vacuum which acts on the top of the control member 160 of the auxiliary valve 155 and here immediately closes the opening 163 against the weak spring 161 thereby making the transmission of the vacuum from the chamber 55' to the chamber 58 above the diaphragm 40 possible. During the opening and particularly in intermediate positions of the control member 160, the throttle 98 prevents excessively rapid flow of air through the auxiliary valve 155. By its construction as a diaphragm valve, the auxiliary valve 155 operates practically without friction which is very important since the valve system is intended predominantly for air which does not contain oil and accordingly lubrication of pistons or the like is to be avoided.

The valve system of both embodiments shown can also be used individually wherever purely pneumatic control is desired for the connecting and disconnecting of the feeding of compressed air. The pneumatic valve system can also be used to relieve the line from the compressor to the storage tank without a drier and separator or also merely with an oil-water separator without an adsorption filter.

What I claim and desire to secure by Letters Patent is:

1. A pneumatic valve control system having an inlet connected to a source of compressed gas and an outlet connected to a point of delivery of said gas, said valve control system comprising a housing providing a cavity, a diaphragm dividing said cavity into upper and lower chambers, said lower chamber comprising means for separating liquid from said gas if liquid occurs therein, such separated liquid being collected in said lower chamber, a tap opening at the bottom of said lower chamber, a valve member associated with said tap opening and movable between open position for opening said tap opening and a closed position for closing said tap opening, means connecting said valve member with said diaphragm for movement of said valve member between an open position in which said tap opening is open and a closed position in which said tap opening is closed, a suction ejection nozzle having a suction chamber in which a reduced pressure is produced by flow of gas through said nozzle, passage means connecting said suction ejection nozzle between said lower chamber and said outlet in communication therewith so that said gas flowing through said suction ejection nozzle in flowing from said lower chamber to said outlet produces a reduced pressure in said suction chamber, passage means connecting said lower chamber with said inlet and passage means connecting said upper chamber with said suction chamber of said nozzle and thereby providing a pressure differential on said diaphragm to deflect said diaphragm when there is a flow of said gas of predetermined rate from said inlet to said outlet through said lower chamber and through said nozzle, said valve member being in closed position when said diaphragm is thus deflected to close said tap opening and being in open position when said diaphragm is not thus deflected to open said tap opening and thereby permit back flow of said gas from said outlet out through said tap opening and discharge of any such liquid collected in said lower chamber.

2. A valve system according to claim 1, further comprising a bypass valve connected between said lower chamber and said outlet in communication therewith and in parallel with said suction ejection nozzle, said bypass valve being biased to provide a predetermined pressure drop across said nozzle while permitting flow of said gas from said lower chamber to said outlet at a rate exceeding the capacity of said nozzle.

3. A valve system according to claim 1, further comprising a check valve connected between said lower chamber and said outlet in communication therewith and in parallel with said suction ejection nozzle, said check valve opening when the pressure at said outlet exceeds the pressure in said lower chamber to permit flow of said gas in reverse direction from said outlet and through said tap opening.

4. A valve system according to claim 1, further comprising a passageway extending from said upper chamber to the atmosphere and auxiliary valve means in said passageway for connecting said upper chamber to the atmosphere in the event of said gas being again supplied from said source to said inlet after a short interruption, thereby closing said tap opening.

5. A valve system according to claim 4, in which said auxiliary valve means comprises closure means movable to close and open said passageway, means defining an auxiliary cavity and a valve control member movable in said auxiliary cavity and connected with said closure means, means subjecting one side of said valve control member to the pressure at said outlet, and spring means biasing said control member in opposition to such pressure, said closure means being movable by said valve control member to open said auxiliary valve means to connect said upper chamber to the atmosphere when the force exerted by said spring means on said control member is greater than the force exerted by said pressure on said control member.

6. A valve system according to claim 4, in which said auxiliary valve means comprises means defining a cavity, a flexible diaphragm dividing said cavity into a first chamber and a second chamber, means defining an outlet opening for said first chamber, first passage means connecting said second chamber with said lower chamber, said passageway comprising second passage means connecting said first chamber with said upper chamber and third passage means connecting said outlet opening with the atmosphere, closure means on said diaphragm movable by flexing of said diaphragm between a position in which it closes said outlet opening so as to close said third passage means and a position in which it opens said outlet opening so as to open said third passage means and thereby place said upper chamber in communication with the atmosphere.

7. A valve system according to claim 6, further comprising spring means acting on said diaphragm of said auxiliary valve means to bias said diaphragm in a direction to open said outlet opening.

8. A valve system according to claim 6, further comprising fourth passage means connecting said first chamber with said suction chamber of said suction ejection nozzle.

9. A valve system according to claim 4, in which throttling means is provided in said passageway between said upper chamber and the atmosphere to restrict the flow of said gas therethrough.

10. A valve system according to claim 1, comprising sound absorbing filter means positioned at said tap opening to muffle sound emitted at said opening.

11. A valve system according to claim 1, comprising a bypass valve and a check valve connected in parallel with one another and with said suction ejection nozzle between said lower chamber and said outlet and an auxiliary valve for connecting said upper chamber with the atmosphere, said housing comprising a unitary housing which houses all of said valves.

12. A valve system according to claim 11 in apparatus for producing dry compressed air, said apparatus comprising an adsorption filter through which the air is passed, said adsorption filter being connected between said suction ejection nozzle and said outlet in communication therewith and being housed in said unitary housing of said valve system.

13. A valve system according to claim 12, in which said housing is of heat conductive material to provide uniformity of temperature.

14. In a system for producing dry compressed gas, comprising means for supplying compressed gas, means for storing dry compressed gas, liquid separator means, filter means including adsorption filter means and having an inlet, and first passage means connecting said separator means and filter means sequentially between said supply means and said storing means for communication therewith; the improvement comprising a pneumatic valve control system in combination with said separator means, said separator means and valve control system comprising housing means providing a cavity, a flexible diaphragm dividing said cavity into an upper chamber and a lower chamber having an inlet and an outlet, said first passage means including means connecting said inlet of said lower chamber with said supply means, baffle means disposed in said lower chamber between said inlet and outlet for separating liquid from said gas, said liquid collecting in said lower chamber, a tap opening in the bottom of said lower chamber, valve means associated with said tap opening and movable between an open position for opening said tap opening and a closed position for closing said tap opening, means connecting said valve means with said diaphragm for movement by said diaphragm between open and closed position, a suction ejection nozzle having a suction chamber in which a reduced pressure is produced by flow of gas through said nozzle, said first passage means further including means connecting said suction ejection nozzle between said outlet of said lower chamber and said inlet of said filter means in communication therewith so that said gas flowing through said suction ejection nozzle in flowing from said separator means to said filter means produces a reduced pressure in said suction chamber, second passage means connecting said suction chamber of said ejection nozzle with said upper chamber in communication therewith to provide a pressure differential on said diaphragm to deflect said diaphragm when there is a flow of said gas at a predetermined rate through said nozzle and thereby move said valve means to closed position, said valve means being biased to open position when said diaphragm is not thus deflected, whereby said valve means is maintained in closed position by said diaphragm to close said tap opening when said gas is supplied by said supply means and flows through said separator means, valve control system and filter means to said storing means, and is moved to open position, when said gas is not so supplied, to open said tap opening to drain said collected liquid from said lower chamber and to permit back flow of said gas from said storing means through said filter means to regenerate said adsorption filter means.

15. A combination according to claim 14, further comprising bypass valve means and passage means connecting said bypass valve means between said outlet of said lower chamber and said inlet of said filter means in communication therewith and in parallel with said suction ejection nozzle, said bypass valve means comprising means for biasing said bypass valve means toward closed condition to provide a predetermined pressure drop regardless of the rate of flow of sid gas therethrough so as to provide a predetermined pressure drop across said suction ejection nozzle when said gas is supplied by said supply means regardless of the rate of supply.

16. A combination according to claim 14, further comprising check valve means and passage means connecting said check valve means between said outlet of said lower chamber and said inlet of said filter means in communication therewith and in parallel with said suction ejection nozzle, said check valve means opening when the pressure at said inlet of said filter means exceeds the pressure at the outlet of said lower chamber to permit flow of said gas in reverse direction from said storing means to said tap opening.

17. A combination according to claim 14, further comprising auxiliary valve means for connecting said upper chamber to the atmosphere in the event of said gas being again supplied by said supply means after a short interruption, thereby closing said tap opening.

18. A combination according to claim 14, further comprising biased bypass valve means for providing a predetermined pressure drop regardless of the rate of gas flow therethrough, check valve means, and passage means connecting said bypass valve means and said check valve means between said outlet of said lower chamber and said inlet of said filter means in communication therewith and in parallel with said suction ejection nozzle and with one another, said check valve means being connected to permit backflow from said filter means to said separator means.

19. A combination according to claim 18, further comprising auxiliary valve means for connecting said upper chamber to the atmosphere in the event of said gas being again supplied by said supply means after a short interruption, thereby closing said tap opening.

* * * * *